United States Patent [19]

Urbutis et al.

[11] Patent Number: 4,493,130
[45] Date of Patent: Jan. 15, 1985

[54] SHIRRED CASING ARTICLE METHOD AND APPARATUS

[75] Inventors: Algimantas P. Urbutis, Palos Heights; Peter H. Jagel, Hinsdale, both of Ill.

[73] Assignee: Union Carbide Corporation, Danbury, Conn.

[21] Appl. No.: 434,559

[22] Filed: Oct. 15, 1982

[51] Int. Cl.³ .............................................. A22C 11/00
[52] U.S. Cl. ......................................... 17/49; 17/41; 138/118.1; 53/576; 206/802; 428/36
[58] Field of Search ................ 17/1 R, 35, 41, 42; 138/118.1; 206/802; 428/36; 53/576

[56] References Cited

U.S. PATENT DOCUMENTS

| 2,001,461 | 5/1935 | Hewitt | 17/45 |
|---|---|---|---|
| 2,028,691 | 1/1936 | Schenk | 206/46 |
| 3,082,682 | 3/1963 | Kaufman | 100/3 |
| 3,209,398 | 10/1965 | Ziolko | 17/42 |
| 3,826,853 | 7/1974 | Levaco | 426/132 |
| 3,952,370 | 4/1976 | Greider | 17/41 |
| 4,132,047 | 1/1979 | Gerigk et al. | 17/1 R X |
| 4,150,613 | 4/1979 | Smee | 100/3 |
| 4,292,711 | 10/1981 | Becker | 17/41 X |
| 4,307,488 | 12/1981 | Lofland et al. | 17/42 |

FOREIGN PATENT DOCUMENTS

| 942207 | 9/1966 | United Kingdom . |
|---|---|---|
| 1043435 | 9/1966 | United Kingdom . |
| 1104528 | 2/1968 | United Kingdom . |
| 1167377 | 10/1969 | United Kingdom . |

Primary Examiner—Willie G. Abercrombie
Attorney, Agent, or Firm—Roger Aceto

[57] ABSTRACT

A shirred casing article including a compacted strand of shirred casing functionally engaged about a tubular core, wherein the core is formed with end portions which capture an axially compacted length of the strand to the core without interfering with subsequent deshirring. The end portions preferably are formed while the casing strand is being held under compression so that a fully compacted length is captured to the core.

29 Claims, 7 Drawing Figures

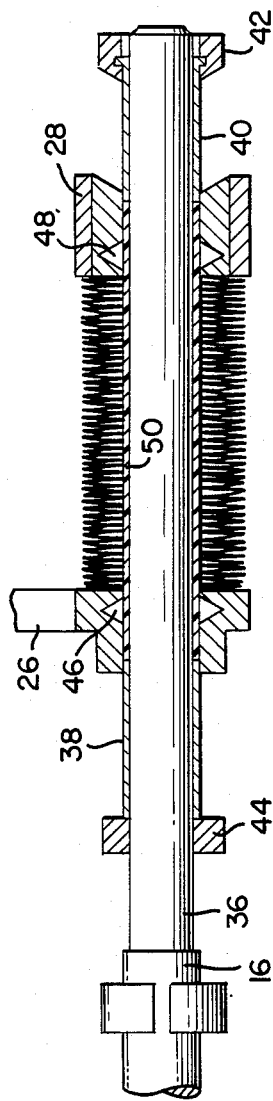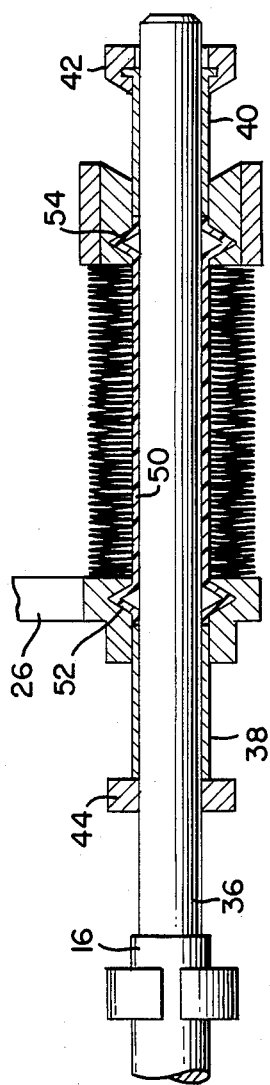
FIG. 4
FIG. 5

SHIRRED CASING ARTICLE METHOD AND APPARATUS

BACKGROUND OF THE INVENTION

The present invention relates generally to shirred casing articles of the type wherein a length of shirred casing is carried on a tubular core member. More particularly, the invention relates to such an article including means for restraining the ends of a compacted length of shirred casing to prevent axial growth of the casing with respect to the core member. The invention also relates to a method and apparatus for capturing a fully compacted length of shirred casing.

Shirred tubular casings are well known in the art. Such casings are extensively used in food processing to make a variety of sausage type products and in the packaging of larger food products, such as cooked and smoked hams and the like.

Briefly, during the shirring process, relatively long lengths o. casing are shirred, by any one of several conventional techniques, to produce a relatively short, tubular strand of shirred casing. Still further length reduction is accomplished by subjecting the strand of shirred casing to an axial force so as to compact the pleats formed by shirring. Depending on the size and length of the casing, the force applied to compact a shirred strand may exceed 1000 pounds or more. The end result is that it is not uncommon in the art to have a compact strand of shirred casing which is only about 1% of the length of the unshirred casing. The degree of compaction is expressed in terms of a pack ratio (PR), which is the ratio of the casing length to the length to the compacted strand. For example, depending upon the diameter and wall thickness of the casing, as well as other factors, it is not uncommon to obtain pack ratios of 100 or more. That is, a compacted strand measuring one foot in length may contain 70 to 100, or more, feet of casing. Such a compacted strand is referred to in the art as a "stick".

One drawback of these compacted strands of shirred casings, or sticks, is that the stick is resilient. It will begin to grow or elongate as soon as the compaction force is released. This growth is most rapid immediately after the stick is formed, and gradually diminishes over a period of time. Accordingly, this growth may continue for at least part of the time that the stick is being held in stock and prior to use.

This resiliency, and tendency of the stick to grow after compaction, is vexing, because a stick must be compacted to a shorter length in order to accomodate the expected longitudinal growth. Growth also has the effect of reducing the pack ratio of the stick.

Various methods have been tried, and are presently employed, to counteract the resiliency of shirred casing sticks. These include, for example, adjustments in compacting methods, and use of various capturing means for resisting stick growth.

The former is illustrated by U.S. Pat. No. 3,209,398 where several applications of gradually increasing compaction force are used to compact the stick in order to reduce the tendency of the stick to return to its uncompressed length. In still another compaction method, the stick is held under compression for an extended period of time to reduce the resiliency of the stick.

A copending application of Mahoney, et al, Ser. No. 363,851 filed Apr. 5 1982, shows that shirred casing lengths can be highly compacted about a core member to achieve higher than conventional pack ratios. In this application, the pleats of the compacted casing embrace about the core. Due to the frictional engagement between the core and the casing, use of a core will, to some extent, resist axial growth of the stick. However, growth can be reduced even further by providing capturing means in association with the core to fix or stop the axial growth of the ends of the compacted strand or stick. While restraining means to capture a compacted length of casing have been used in the prior art, they have been lacking in one or more desirable features.

One desirable feature is to restrain and capture the fully compacted, or shortest length. To do this, the ends of the stick must be captured while maintaining the application of the compaction force. Any release of the compacting force in order to effect capture will permit the stick to grow so that something longer than the fully compacted length is captured.

Another desirable feature is that the capturing means should permit the casing to deshirr during the stuffing operation without the need for a separate operation to remove or open the capturing means.

It is also known in the art to place the stick in a retaining carton, either after doffing, as in U.S. Pat. No. 2,001,461, or prior to doffing, as in U.S. Pat. Nos. 2,010,626 and 2,028,691. However, such a restraint must be removed prior to utilization of the stick. Also, such cartons are not appropriate for highly compacted strands which can exert an axial force of 1000 pounds or higher when expanding.

In cases where the casing is carried on a core member, it is known to insert pegs through the core to keep the casing on the core. In other cases, removable washers have been used to restrain one or both ends of the casings (See U.S. Pat. No. 3,826,853 and UK Pat. No. 942,207). UK Pat. Nos. 1,167,377 and 1,104,528 show arrangements where one or both ends of a core member are flared or flanged, to hold the length of a shirred casing. However these patents only mention the retention of shirred casing and do not appear to contemplate retention of a length of casing which has undergone a further compaction step. As set out above, compacted casing may exert axial forces of up to 1000 pounds or more. The inflatable core, or the arrangement of tape, washers or tabs, as disclosed in these patents, would be unable to restrain the axial growth of such casing. Moreover, the restraining means, as taught in these patent, would have to be removed to permit deshirring, which is a still further drawback.

The present invention not only provides for effecting a capture of a fully compacted length of casing, but also allows deshirring without the need to remove the capturing means. Capturing the fully compacted length insures that the stick is maintained at substantially its shortest compacted length; namely, its length while still subjected to the compaction force. Allowing the casing to deshirr without removing the restraining means saves time and effort during the stuffing operation.

In the present invention, the strand of shirred casing is compacted about a core member and, while maintaining the compacting forces, the ends of the compacted casing are captured to the core. This is accomplished in various ways such as, for example, expanding the ends of the core while maintaining the application of the casing compacting forces.

SUMMARY OF THE INVENTION

In its broadest aspect, the casing article of the present invention can be characterized by a tubular core; a compacted strand of shirred tubular casing embracing the outer periphery of the core, the core being sufficiently rigid to resist the forces generated by the casing engaged thereon; holding means on the core adjacent each end of the compacted strand for capturing and holding substantially the fully compacted length of casing strand, and for preventing the axial growth of the compacted strand with respect to the core; and the holding means adjacent at least one end of the core being of a size sufficient to permit deshirring of casing from the compacted strand and over the holding means.

In another aspect, the holding means comprises an enlarged diameter portion of the core formed while maintaining an axially applied compaction force to the strand, the size of the enlarged diameter portion being sufficent to prevent axial growth of the strand after removal of the compacting force, while permitting the deshirring of casing from the strand and over the enlarged diameter.

The method of the present invention can be characterized by the steps of:

(a) locating a strand of shirred casing on a tubular core, the outside diameter of the core being of a size sufficient to permit an embracing engagement of the strand about the outer periphery of the core when the strand is compacted thereon and the core being sufficiently rigid to resist the force generated by a compacted strand of casing; and (b) positioning elements on the core adjacent the ends of the compacted strand so as to capture and restrain the axial growth of the compacted strand with respect to the core, the positioning of the elements being accomplished so as to permit the subsequent deshirring of casing from the strand and over at least one of the elements.

The apparatus of the present invention includes:

(a) a shaft for receiving a tubular core member;

(b) bearing means for supporting the ends of the shaft, at least one of the bearing means being removable to permit loading of the core onto the shaft;

(c) the shaft and core being adapted to receive a strand of shirred casing with the strand, when compacted, being located on the core and being embraced about the outer periphery of the core; and (d) means for positioning casing capturing means on the ends of the core for preventing axial growth of the strand with respect to the core.

DESCRIPTION OF THE DRAWINGS

FIGS. 2-5 are views of the compacting station of the shirring machine on an enlarged scale showing the sequential compacting and capturing steps;

DESCRIPTION OF THE PREFERRED EMBODIMENTS

Figure 1:
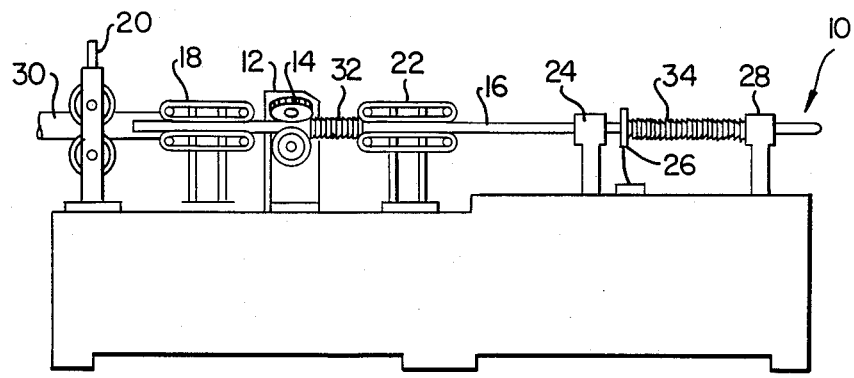
FIG. 1 is an elevational view of a typical shirring apparatus.

Referring to the drawings, FIG. 1 shows a typical floating mandrel-type shirring machine generally indicated at 10. Shirring machines and the products thereof are shown in U.S. Pat. Nos. 2,983,949 and 2,984,574 among others.

A shirring head 12 is mounted on the machine, the head including a plurality of shirring wheels 14. These wheels, usually three or more in number, are of a general type which is described in U.S. Pat. No. 3,461,484.

Shirring wheels 14 are disposed about a mandrel 16 which extends generally the length of the machine. Also disposed about the mandrel, but forward of the shirring head 12, or to the left as viewed in the figure, are feed belts 18 and feed rollers 20. Disposed about the mandrel aft of the shirring head are hold back belts 22, a first clamp 24, a compactor arm 26 and a second clamp 28.

The operation of these components for shirring tubular casing is well known in the art. Briefly, an inflated casing 30 is fed onto mandrel 16 at the fore end by feed rolls 20 and feed belts 18. This casing passes between shirring wheels 14, which shirr the casing against hold back belts 22. As is known in the art, holdback belts 22 retard the advance of the casing passing from the shirring rolls in order to provide substantially regular pleat formation and to partially compact the shirred casing shown at 32. It is also known to rotate the holdback 22 about the mandrel so as to twist the shirred casing. Twisting in this fashion tends to produce straighter strands of shirred casing.

It should be appreciated that the operation of shirring and partially compacting the casing, cause to pleats of the shirred casing to lay at an angle to the axis of mandrel 16, so that the individual pleats nest, one against the other, similar to a stock of nested cones.

After the initial shirring and partial compaction, a strand of the casing is separated, either adjacent the shirring wheels 14 or downstream of the hold back belts 22. This separated strand then is transferred along the mandrel towards first clamp 24. First clamp 24 and compactor arm 26 both open to permit movement of the strand, either manually or by automatic means, to the compacting station which is between the first and second clamps. The operation of first clamp 24 and compactor arm 26, to permit such a transfer, is conventional, and FIG. 1 shows a strand 34 of shirred and partly compact casing at the compacting station.

Figure 2:
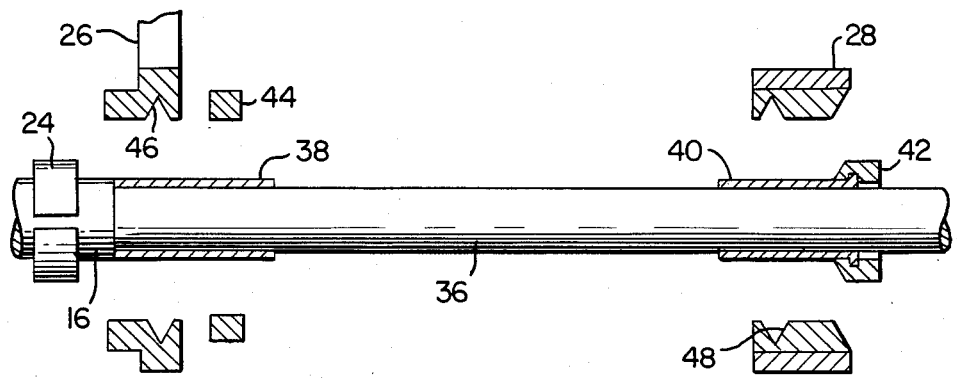

More details of the compacting station are shown in FIG. 2. At the compacting station, a shaft 36 extends axially from mandrel 16, the shaft being smaller in diameter than the mandrel. Slidably disposed on shaft 36 are spaced transfer and retraction sleeves 38, 40, respectively. The space between the two sleeves is to accommodate a core, which is not shown in FIG. 2. This core, preferably, is approximately the length of the shirred casing article to be made. As set out hereinbelow, the core will capture the fully compacted length of casing compacted about the core.

One function of transfer sleeve 38 is to facilitate transfer of the shirred strand along the mandrel and onto the core. The retraction sleeve 40 and a retraction sleeve end pusher 42, as shown in FIG. 2, are removable from shaft 36 to permit the doffing and loading of cores onto shaft 36. An end pusher 44 is also provided for the transfer sleeve 38, this end pusher being located adjacent first clamp 24 as shown in FIG. 2.

FIG. 2 also shows that both compactor arm 26 and second clamp 28 are provided with a groove 46, 48 respectively about their inner peripheries. These grooves function as dies for capturing a compacted length of casing to the core as more particularly set out hereinbelow.

In order to begin the compacting operation, second clamp 28 is opened and retraction sleeve 40 and its end pusher 42 are removed from shaft 36. This permits sliding a suitable core onto the shaft. The retraction sleeve 40 and its end pusher 42 are replaced and second clamp 28 is closed. Next, first clamp 24, compactor arm 26 and end pusher 44 are opened to permit transfer of a strand of casing along the mandrel and onto the core. To facilitate loading the strand onto the core, it is preferred that the core and sleeves have substantially the same outside diameter.

Figure 3:
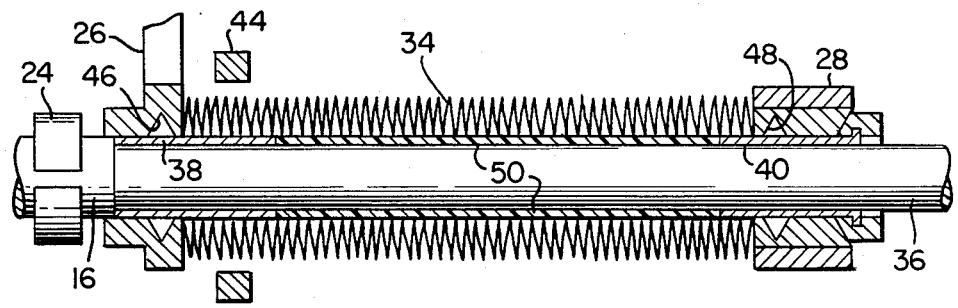

First clamp 24 and compactor arm 26 are then closed so the various components are substantially as shown in FIG. 3.

In FIG. 3, a strand 34 of shirred casing is in position for compacting about a core 50. Compaction is accomplished by moving compactor arm 26 against the strand to compress or compact the strand against second clamp 28.

During compaction, the sleeves 38, 40 and the core 50 are free to slide on shaft 36 in a direction towards second clamp 28. In fact, during compaction, the entire length of retraction sleeve 40 and one end of core 50 will slide through the clamp as shown in FIG. 4. This will effect a so called double ended simultaneous compaction of strand 34.

This method of double ended simultaneous compaction, and its advantages are more particularly described in a copending application, Ser. No. 436,057 filed Oct. 22, 1982. It is sufficient for purposes of the present invention merely to say that in double ended simultaneous compaction, both ends of the strand are moved towards a midpoint, to produce a more uniformly compacted strand or stick of casing.

In any event, regardless of the compaction method used, the casing and core should be sized so that the compacted strand will engage about the periphery of the core.

When the strand is fully compacted and is engaged about the core, as shown in FIG. 4, each end of core 50 has a portion extending across grooves 46, 48 in compactor arm 26 and second clamp 28 respectively. The end pusher 44 for transfer sleeve 38 is now closed about shaft 36. Both end pushers 42 and 44 are then moved inward against the ends of their respective sleeves. The sleeves 38, 40 transmit the force exerted by the end pushers to the ends of core 50.

Application of sufficient force, either by sudden impact or more gradual build-up, will cause portions of the core to fail, and to buckle outwardly into the spaces provided by grooves 46, 48. In this manner, there is a controlled deformation of the core so as to form annular ribs 52, 54 (FIG. 5) of an enlarged diameter about the core adjacent each end of the compacted strand. The portions of the core outboard of ribs 52, 54 do not fail due to the inner support offered by shaft 36 and the outer support offered by the engagement of the compactor arm 26 and clamp 28 against these portions. The portion of the core lying between the ribs does not buckle or fail due to the radial forces exerted on the core by the compacted strand of casing which surrounds the core. The latter clearly illustrates the magnitude of the radial inward forces exerted by the compacted casing, that is, enough support is provided by the compacted casing to prevent localized buckling of the core in this area.

After the ribs 52, 54 are formed, the second clamp 28 is opened and the retraction sleeve 40 and its end pusher 42 are removed. Compactor arm 26 can now push, or doff, from shaft 36, the completed casing article, including the core and the compacted strand of casing which is captured on the core.

The annular ribs 52, 54 are sufficient to capture the ends of the compacted casing on the core and thereby prevent axial growth of the casing. Moreover, these ribs are formed while the casing is still under the loading of the compaction force exerted by compactor arm 26 so that the ribs capture the fully compacted length of the casing strand.

It has been found that the ribs need not be very large in order to effect a capture. For example, a 200 foot length of size 25 casing which has an inflated diameter of about 0.83 inches and a wall thickness of about 0.001 inches, was shirred and the compacted about a core to a length of about 15 inches (PR=160). The core had an outside diameter of 0.560 inches and a wall thickness of 0.025 inches. Ribs formed according to the present invention had an outside diameter of approximately 0.750 inches. These ribs, which extended only about 0.095 inches beyond the outside diameter of the core, were sufficient to maintain the fully compacted length of casing, and they were not so high as to interfere with the deshirring of the casing over the ribs.

To facilitate formation of ribs 52, 54, the core is preferably made of a material that can be cold formed such as a rigid polyvinylchloride or high density polyethylene. However, when using other materials, it would be within the skill of the art to use an RF heater or other heating means if necessary to heat the ends of the core prior to operating sleeve end pushers 42, 44.

Figure 6:
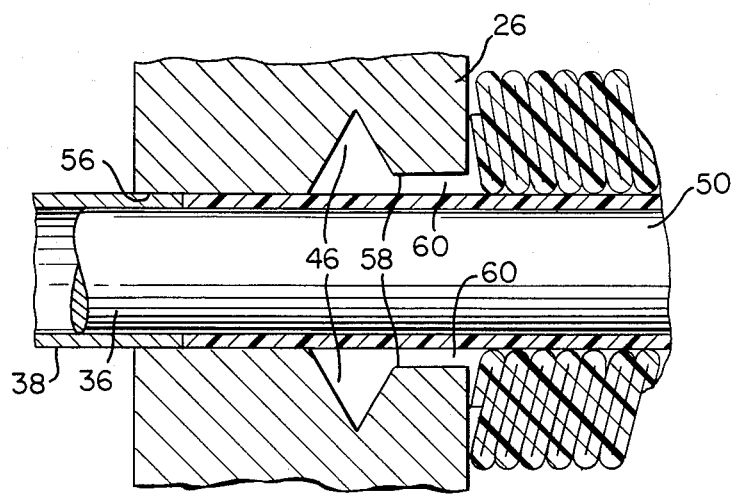
FIG. 6 is a view, on a still larger scale, of a portion of the capturing apparatus.

FIG. 6 shows a slightly modified version of a die as may be used for forming ribs 52 and 54, only the compactor arm 26 being shown for purposes of illustration.

The arm 26 as shown in FIG. 6 is closed about an end of core 50. When closed about the core, the inside diameter of one portion 56 of the arm to the left of groove 46 as viewed in FIG. 6, closely fits the outside diameter of the core and supports the core. However, the inside diameter of the portion 58 of the arm to the right of the groove is slightly larger than the core diameter. This provides a small clearance opening 60.

During the application of an axial force to form rib 52, the core material bulges into this clearance opening 60 as well as into groove 52. The resulting configuration of the end of the core is shown in FIG. 7.

Figure 7:
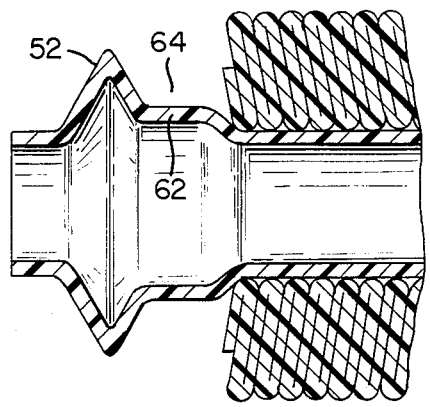
FIG. 7 is a view of a portion of the casing article as made by the apparatus shown in FIG. 6.

FIG. 7 shows that the bulge of core material forms a small step 62 at the end of the compacted strand of casing.

It has been found that for smaller sizes of casing, this small step 62 is sufficient to prevent axial growth of the casing. For example, in a size 25 casing, compacted as described above a step of only 0.010 inches acted to prevent the axial growth of the compacted casing. After a storage period of 7 days, the length was substantially unchanged.

For larger size casings, it is believed that the step may not completely retard axial growth. Instead, it is speculated that the casing will expand over this step and through the space 64 between the step and rib 52 until it abuts against the rib.

In cases where casing is highly compacted, omitting step 62 and having the ends of the compacted casing directly against ribs 52, 54 may interfere with deshirring. In this respect, it may be difficult to pull the end pleats from the compacted casing to start the deshirring process if these pleats are wedged tightly against the ribs. For this reason use of this small step, and a small space 64 is preferred in order to permit a controlled, limited axial or longitudinal expansion of the casing.

In this case a clearance space as shown at 64 may facilitate deshirring. For example, allowing only ends of the compacted casing to expand over step 62 and into space 64, reduces the axial force against the end pleats. This would make it easier to pull these pleats from the compacted casing and over one or another of the ribs to start deshirring.

It should be appreciated that capturing could be accomplished by positioning elements against the ends of the compacted strand while maintaining the compaction force. For example, the clearance opening 60 as shown in FIG. 6 could be extended to include the inside diameter of portion 56 to the left of groove 58. With this arrangement a suitable ring-shaped element could be slipped over the shaft 36 and through this clearance opening to abut the end of the compacted strand. This ring-shaped element could then be welded or otherwise fixed to core 50. The thickness of such an element would be about the same as the height of step 62.

The present invention can also be used in association with compaction methods other than the double ended simultaneous method as described hereinabove. For example, single ended compaction is a conventional compaction method. While the compaction apparatus is similar, a major distinction is that no sliding sleeve or core is used. Instead, the strand of shirred casing is located on a fixed mandrel and compacted from one end. It is believed that modification of the present invention for use with other compaction methods would be within the skill of the art.

For example, the strand could be compacted about a mandrel, transferred to core, recompacted on the core and then, while maintaining the recompacting force, the ends of the casing can be captured.

In cases where excessive growth may not occur immediately after release of the compacting force, such as where the casing is not highly compacted to begin with or where there is excessive friction between the casing and the core, it may be possible to capture a length approaching the fully compacted length without maintaining the application of the compactor arm against the casing.

It also should be apparent that compaction and capturing can be done at separate stations rather than being done at the same station as described herein. After compaction at one station, the compacted strand can be transferred to another station where the casing is recompressed and the ends are captured to the core. Thus "compacting" as used herein should be taken to mean both an initial compaction step wherein both compaction and capturing occur at the same station, or a subsequent compaction resulting from a reapplication of a compaction force to permit capturing.

Having described the invention in detail, what is claimed as new is:

1. A shirred casing article comprising:
   (a) a tubular core;
   (b) a compacted strand of shirred tubular casing engaged on said core, said compacted strand having pleats embracing and exerting radial inward forces on the outer periphery of said tubular core and the core being sufficiently rigid to resist said forces;
   (c) holding means on said core adjacent each end of said compacted strand for capturing and holding said compacted strand at a desired compacted length, said means being effective to prevent axial growth of said compacted strand with respect to said core; and
   (d) said holding means adjacent one end of said strand being of a size sufficient to permit deshirring of casing from said compacted strand and over said holding means at said one end.

2. A shirred casing article as in claim 1 wherein said holding means are peripheral ribs formed integral said tubular core adjacent the ends thereof.

3. A shirred casing article as in claim 2 wherein said ribs are formed while maintaining an applied compaction force to said compacted strand of casing.

4. A shirred casing article as in claim 2 or 3 wherein said ribs comprise material of said tubular core which has buckled radially outward responsive to an axial loading on the ends of said core.

5. A shirred casing article as in claim 1 wherein said core includes at least one diametrically enlarged portion adjacent said one end of said compacted strand, said enlarged portion defining a step of core material which engages terminal end pleats of said compacted strand at said one end, said one end being the end from which casing must deshir during stuffing of the casing.

6. A shirred casing article as in claim 5, including a rib about said core, said rib being larger in diameter than said step and being positioned on the far side of said step from said terminal end pleats so that said rib and said terminal end pleats of said strand define a space therebetween, said rib and step comprising said holding means.

7. A shirred casing article as in claim 6 wherein said rib and step are formed from said core while maintaining a longitudinally applied compaction force on said compacted strand.

8. A shirred casing article comprising
   (a) a tubular core;
   (b) a compacted strand of shirred tubular casing frictionally engaged about the outer periphery of said core, the length of said compacted strand being shorter than said core;
   (c) holding means on said core adjacent the ends thereof for preventing axial growth of said compacted strand along said core, said holding means adjacent at least one end of said core comprising an element having an outside diameter which is larger than the outside diameter of said core, and which is large enough to prevent longitudinal growth of said compacted strand yet small enough to permit the deshirring of casing from said strand and over said element.

9. A shirred casing article as in claim 8 wherein said element includes a portion of the material of said core formed to an enlarged outside diameter.

10. A shirred casing article as in claim 9 wherein said element is formed from the material of said core while maintaining a longitudinally applied compacting force to said strand of shirred casing.

11. A shirred casing article as in claim 8, wherein said element comprises an annular rib of core material.

12. A shirred casing article as in claim 11 wherein said rib is buckled outwardly from said core responsive to a longitudinally force applied to the ends of said core.

13. A method of making a shirred casing article comprising the steps of:

(a) locating a shirred, and at least partly compacted, strand of casing on a tubular core, the outside diameter of said core being of a size sufficient to permit an embracing engagement of said strand about the outer periphery of said core wherein said strand exerts radial inward forces on said core and said core being sufficiently rigid to resist the forces generated by said compacted strand of casing:

(b) positioning elements on said core adjacent the ends of said strand so as to capture and restrain the axial growth of said strand with respect to said core, the positioning of said elements being accomplished so as to permit the subsequent deshirring of casing from said strand and over at least one of said elements.

14. A method as set forth in claim 13 wherein said positioning is accomplished by forming portions of said core into said elements.

15. A method as in claim 14 wherein said forming step is accomplished while maintaining said strand subject to a force applied in a direction to compact said strand.

16. A method as in claim 14 including the step of at least partly compacting said strand on said core by applying an axially directed compacting force to at least one end of said strand, said forming step being accomplished while maintaining said strand subjected to at least a portion of said compacting force.

17. A method as set forth in claim 14 including the step of compacting said strand by applying substantially equal and opposite compacting forces simultaneously to both ends of said strand for moving said strand ends axially inward from the associated ends of said core; and thereafter forming both ends of said core to provide said elements so as to capture both ends of said compacted strand to said core while maintaining said compacting forces.

18. A method as set forth in claim 14 wherein the step of forming is accomplished by expanding the diameter of said core adjacent the ends of said compacted strand.

19. A method as in claim 14 wherein the step of forming is accomplished by:

(a) placing a die about the periphery of said core adjacent at least one end of said compacted strand, said die having a groove formed about its inner periphery; and (b) applying a longitudinally inward force to the ends of said core to buckle a portion of said core into said groove to form an annular rib about said core, said rib acting to capture an end of said compacted strand.

20. A method of making a shirred casing article comprising the steps of:

(a) locating a strand of shirred casing on a relatively rigid core member;

(b) compacting said strand to a compacted length sufficient to provide that said compacted strand embraces about the outer periphery of said core and to provide that said compacted length is shorter than said core so that the ends of said core extend outward from each end of said compacted strand;

(c) maintaining a compacting force on said strand to hold the same at said compacted length; and (d) capturing the ends of said compacted strand with respect to said core while maintaining said compacting force, said capturing being accomplished by means which permits subsequent deshirring of said casing without removal of said means.

21. A method as in claim 20 wherein said capturing step is accomplished by enlarging the diameter of said core adjacent the ends of said strand while maintaining said compacting force, the resulting core diameter enlargement being sufficient to prevent the longitudinal growth of said strand along said core while allowing casing to deshirr over said enlargement.

22. A method as set forth in claim 21 wherein enlarging the diameter of said core adjacent the ends of said strand is accomplished by directing longitudinally inward compressive forces against the ends of said core to provide a controlled outward buckling of said core between the ends of said strand and the ends of said core.

23. A method as in claim 22 wherein said controlled buckling is accomplished by placing dies against the outer periphery of said core adjacent the ends thereof, said dies each having a groove into which said core buckles response to the application of said compressive forces.

24. Apparatus for forming a casing article comprising:

(a) a shaft for receiving a tubular core member:

(b) bearing means for supporting the ends of said shaft, at least one of said bearing means being removable to permit loading of said core onto said shaft;

(c) said shaft and core being adapted to receive a compacted strand of shirred casing which embraces about the outer periphery of said core; and (d) means for forming capturing means from the material of said core and adjacent the ends of said strand for preventing longitudinal growth of said strand with respect to said core.

25. Apparatus as set forth in claim 24 wherein said forming means forms said capturing means while maintaining a strand received on said core in a substantially compacted condition.

26. Apparatus as in claim 24 including a pair of spaced sleeve members slidably carried by said shaft, said sleeves and core having substantially the same outside diameter and one of said sleeves being removable from said shaft to permit loading said core onto said shaft and between said sleeves.

27. Apparatus as in claim 6 including drive means operable for driving each of said sleeves longitudinally inward against the ends of said core with sufficient force to cause portions of said core adjacent the ends of said strand to buckle outwardly, said buckled portions comprising said casing capturing means.

28. Apparatus as in claim 7 including die members positionable against said core adjacent the ends thereof to control the amount of buckling of said core responsive to the operation of said drive means.

29. Apparatus as in claim 24 including:

(a) compaction means for imposing a compacting force on said strand of casing; and (b) means for forming the ends of said core into rib members adjacent the ends of said strand while maintaining said compaction force.

* * * * *

UNITED STATES PATENT AND TRADEMARK OFFICE
CERTIFICATE OF CORRECTION

PATENT NO. : 4,493,130
DATED : January 15, 1985
INVENTOR(S) : Algimantas P. Urbutis and Peter H. Jagel It is certified that error appears in the above-identified patent and that said Letters Patent is hereby corrected as shown below:

Col. 1, line 21, change "lengths o casing" to --lengths of casing--.

Col. 4, line 30, change "cause to pleats" to --cause the pleats--.

Col. 10, line 49, change "as in claim 6" to --as in claim 26--.

Col. 10, line 55, change "as in claim 7" to --as in claim 27--.

Signed and Sealed this

Eighteenth Day of June 1985

[SEAL]

Attest:

DONALD J. QUIGG

Attesting Officer

Acting Commissioner of Patents and Trademarks